United States Patent [19]

Sommer et al.

[11] 4,315,285
[45] Feb. 9, 1982

[54] METHODS FOR CONVERTING A VIDEO SIGNAL INTO A BLACK/WHITE SIGNAL

[75] Inventors: Ruediger Sommer, Raisdorf; Hermann Wischer, Kiel, both of Fed. Rep. of Germany

[73] Assignee: Dr.-Ing. Rudolf Hell GmbH, Kiel, Fed. Rep. of Germany

[21] Appl. No.: 62,696

[22] Filed: Aug. 1, 1979

[30] Foreign Application Priority Data

Aug. 21, 1978 [DE] Fed. Rep. of Germany ....... 2836571

[51] Int. Cl.$^3$ .............................................. H04N 1/00
[52] U.S. Cl. .................... 358/280; 328/147; 358/284
[58] Field of Search ............... 358/166, 280, 96, 282, 358/283, 284; 328/135, 147, 150

[56] References Cited

U.S. PATENT DOCUMENTS

| | | | |
|---|---|---|---|
| 2,900,442 | 8/1959 | Kouasznay | 358/96 |
| 3,668,532 | 6/1972 | Potash | 328/147 |
| 3,723,649 | 3/1973 | Pitegoff et al. | 358/280 |
| 3,868,477 | 2/1975 | Katzman | 358/284 |

OTHER PUBLICATIONS

Bruder—Instrumentation for Mapping Light Intensity Contours, IEEE Trans. on Vehicular Technology, vol. VT 19, #3, Aug. 1970, pp. 225-229.

*Primary Examiner*—Joseph A. Orsino, Jr.
*Attorney, Agent, or Firm*—Brisebois & Kruger

[57] ABSTRACT

The invention relates to facsimile reproduction and particularly to a method for converting a video signal obtained by scanning an original dot by dot and line by line, into a bilevel black/white signal.

In the black/white recording of colored originals in which both the background and the information can be white, black, grey or colored, grey/black transitions coming from "white" and grey/white transitions coming from "black" are frequently not evaluated correctly by the dynamic threshold so that information is lost in the copy.

In order that these types of transitions are also detected, it is suggested to eliminate the DC component of the video signal and to compare the video signal modified in this way with a second dynamic threshold signal derived from it. The comparison signal is logically linked to the customary black/white signal in such a manner that the black/white signal is flipped to "white" at a grey/black transition and to "black" at a grey/-white transition in each case for a specified time interval.

In this manner, for example between a colored area in the original recorded as "black" and a black letter in this area, a white boundary line is created which makes the front contour of the letter visible. Similarly, between a colored area in the original reproduced as "white" and the white edge of the original copy a black boundary line is generated which makes the contours of the colored area in the original clearly recognizable.

12 Claims, 5 Drawing Figures

METHODS FOR CONVERTING A VIDEO SIGNAL INTO A BLACK/WHITE SIGNAL

BACKGROUND OF THE INVENTION

The present invention relates to facsimile reproduction and particularly to methods for converting a video signal, generated by scanning an original copy dot by dot and line by line, into a bilevel black/white signal, and a circuit arrangement for carrying out the method.

In black/white facsimile reproduction, an original to be copied is scanned dot by dot and line by line in a scanner by means of an opto-electronic scanning member and the brightness information of the original is converted into a video signal.

The original may be a printed or type-written document, a hand-written text or a graphic representation in which both the background of the original and the information placed on it can be white, black or tinted (grey; coloured).

The video signal obtained by scanning the original is amplified, converted into a bilevel black/white signal by comparing it with a threshold signal and transmitted to a receiver via a transmission channel. The recording element of the receiver controlled by the video signal generates the required copy of the original.

When a white portion of the image of the original copy is being scanned the scanning member provides a high video signal amplitude, scanning a black portion of the image results in a low amplitude and a grey or coloured detail in the original in a medium amplitude of the video signal.

In order to generate the black/white signal, the different video signal amplitudes are continuously compared with the threshold signal to arrive at a decision if a video signal amplitude is to be evaluated as "white" or "black".

There are difficulties in correctly evaluating small variations in amplitude in the video signal caused by low contrast between the information and the background, often leading to losses of information in the copy.

U.S. Pat. No. 3,159,815 describes a method of comparing the video signal with a constant threshold signal for converting it into the black/white signal. With this so-called "constant threshold" evaluation is quite inadequate with a tinted original copy. If, for example, an original with a tinted background and black or white information content is scanned and the decision for medium amplitudes of the video signal is for "black" the black information on tinted background is lost; if, on the other hand, the decision is for "white" the white information on tinted background will not be considered.

German patent specification No. 1537560 describes a facsimile scanner with a threshold circuit in which the black/white signal is obtained by comparing the video signal with a threshold signal which follows it dynamically.

Although the so-called "dynamic threshold" is suitable for correct evaluation of small amplitude changes it will provide inadequate results if a white area in the original copy is followed in the direction of scanning by a tinted and a black area (white/grey/black transition) or a black area is followed by a tinted and a white area in the original copy (black/grey/white transition).

Since the scanning member recognizes both a grey and a coloured, that is a tinted, area in the original copy as "grey", for reasons of simplicity the text which follows will talk about transitions from and to "grey".

A typical example for such transitions is provided by a white-edged original copy with a tinted (grey or coloured) background containing black information (letters). The said threshold circuit interprets the tinted background following a white/grey transition as "black". In the copy, therefore, the front edge of the first black item of information is lost, that is a grey/black transition is ignored.

In addition, the threshold circuit interprets such a background area after a black/grey transition as "white". In the copy, therefore, the boundary between the background area and the white edge of the original copy is lost, that is a grey/white transition is also ignored.

The loss of information in the copy is considered to be a considerable disadvantage of the known threshold circuit.

Although it would be possible to adjust the customary threshold circuit to such a sensitivity that the background area is evaluated as "white" and the black information on it is recognized, information of low density such as, for example, red writing on a white surface would be lost. Thus individual adjustment will always only result in a compromise between high sensitivity and loss of information. The prerequisite for such adjustment is an experienced operator, and it is also time-consuming since test copies must be made for evaluation.

It is an object of the invention, therefore, to specify a method and a circuit arrangement in facsimile reproduction, for converting a video signal obtained by scanning an original copy dot by dot and line by line, into a bilevel black/white signal by means of which coloured original copies are converted to purely black/white copies without any significant loss of information. With these original copies both the background areas and the information placed on them can be tinted (coloured, grey), black or white.

SUMMARY OF THE INVENTION

According to the invention, this object is achieved in that a "black" ("white") tinted area in the original copy, following in the direction of scanning a white (black) area in the original copy, is recorded with a white (black) boundary line running across the direction of scanning at the transition from the tinted to an adjacent black (white) area in the original copy.

BRIEF DESCRIPTION OF THE DRAWINGS

In order that the invention may be more clearly understood, certain illustrative embodiments thereof will now be described in conjunction with the accompanying drawings, by way of example and in which.

DETAILED DESCRIPTION OF PREFERRED EMBODIMENTS

Figure 1:
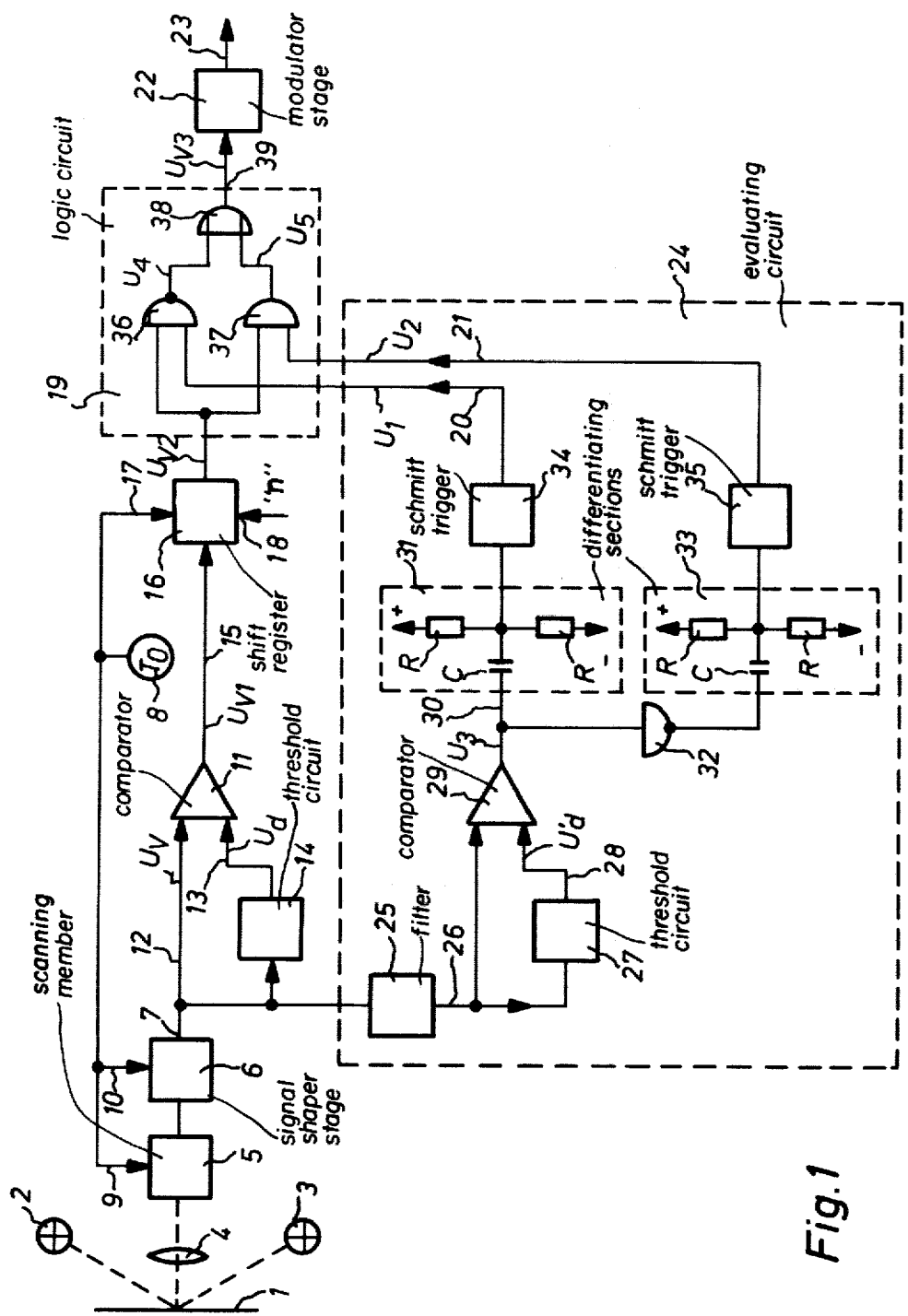
FIG. 1 shows a block diagram of a facsimile scanner.

Referring now to the drawings, FIG. 1 shows the basic design of a facsimile scanner with a circuit arrangement for converting a video signal into a bilevel black/white signal.

The original 1 to be copied is illuminated by two light sources 2 and 3 and the scanning light modulated with the brightness information of the original 1 is reflected through an optical system 4 into a scanning member 5, where it is converted into a video signal by means of an opto-electronic transducer.

The opto-electronic transducer may be a single photo diode which delivers a video signal which is continuous in value. In this case the scanning member 5 performs a relative movement with respect to the original 1 in the direction of the lines and advances to the next line after having scanned a line in each case.

On the other hand, the opto-electronic transducer may alternatively comprise a plurality of photo diode (photo dioderow) supplying a pulsed or step-shaped video signal. Since the row of photo diodes extends over one line of the original 1 a whole line is scanned simultaneously without any relative movement between the scanning element 5 and the original 1 and then an advance step to the next line is performed.

No advance devices are shown since they do not per se from part of the invention and are known as state of the art.

The video signal generated by the scanning member 5 is amplified in a following signal shaper stage 6 and, if necessary, converted into a step-shaped video signal $U_v$ by means of a sample and hold circuit, if the video signal is pulsed, and appears at an output 7 of the pulse shaper stage 6.

A scanning clock $T_O$ controls the dot-by-dot scanning of the original 1 and the signal conversion in the pulse shaper stage 6. The scanning clock $T_O$ is generated in a clock generator 8 and is fed to the scanning member 5 via a line 9 and to the pulse shaper stage 6 via a line 10. Each clock cycle of the scanning clock $T_O$ is associated with a scanned picture element.

The video signal $U_v$ is first converted into the bilevel black/white signal $U_{v1}$.

A first comparator 11 compares the video signal $U_v$ on a line 12 with a first dynamic threshold signal $U_d$ on a line 13 derived in a first threshold circuit 14 from the video signal $U_v$. The result of the comparison is the black/white signal $U_{v1}$ at the output of the comparator 11 on a line 15.

The black/white signal $U_{v1}$ is delayed by "n" clock cycles of the scanning clock $T_O$, used as shift clock on a line 17, corresponding to the distance in time of "n" scanned picture elements. The shift register 16 is made up of, for example, components of type SN 74 194 supplied in commerce by Texas Instruments. The number "n" can be preprogrammed at an input 18 of the shift register 16.

The delayed digital black/white signal $U_{v2}$ is converted in a logic circuit 19 by two digital control signals $U_1$ and $U_2$ on the lines 20 and 21 into the black/white signal $U_{v3}$ which is transmitted via a modulator stage 22 and a transmission channel 23 to a facsimile receiver, not shown, for recording the facsimile of the original copy. The transmission channel 23 can be a radio link or a line.

The operation of the threshold circuit 14 corresponds to the customary threshold circuit for generating a dynamic threshold signal. As explained already in the descriptive introduction, such a threshold circuit will ignore grey/black and grey/white transitions so that the black/white signal $U_{v1}$ at the output of the comparator 11 already contains losses of information.

In order to compensate for these losses of information the black/white signal $U_{v2}$ is modified in the logic circuit 19 in dependence on the digital control signals $U_1$ and $U_2$. The digital control signals $U_1$ and $U_2$ are derived from the video signal $U_v$ in an evaluation circuit 24.

A high-pass filter 25 is advantageously used to eliminate the DC component from the video signal $U_v$ and the modified video signal $U'_v$ on a line 26 a second threshold signal $U'_d$ on a line 28 is generated in a further threshold circuit 27. The threshold signal $U'_d$ and the modified video signal $U'_v$ are compared in a further comparator 29 where, among others, also the grey/black and grey/white transitions ignored by the threshold circuit 14 are recognised. The result of the comparison is the signal $U_3$ on a line 30.

Figure 5:
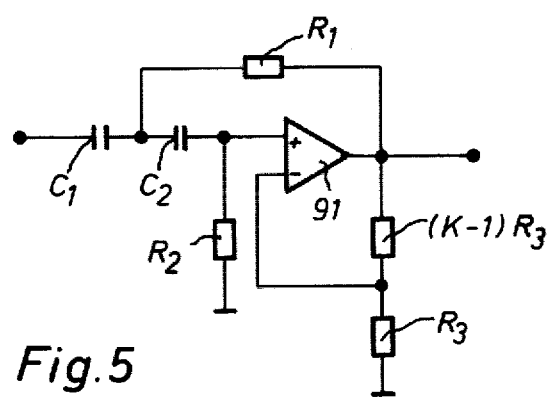
FIG. 5 shows an illustrative embodiment of a high-pass filter.

The threshold circuits 14 and 27 are of identical design. An illustrative embodiment is given in FIG. 4. An illustrative embodiment of a high-pass filter is shown in FIG. 5.

The comparators 11 and 29 are, for example, integrated circuit components of type LM 311 supplied in commerce by National Semiconductors. These components supply at their output digital signals with TTL levels (logical H; logical L) so that they can be combined directly with logic circuit components.

The signal $U_3$ on the line 30 is fed simultaneously to a first differentiating section 31 and via an inverter 32 to a second differentiating section 33. The differentiating sections 31 and 33 are followed by Schmitt triggers 34 and 35 which are made up of for example, integrated circuit components of type SN 7413 supplied in commerce by Texas Instruments.

In the first differentiating section 31 and the Schmitt trigger 34 the negative-going edges of the signal $U_3$ are evaluated and converted into the digital control signal $U_1$. The second differentiating section 33 and the Schmitt trigger 35, on the other hand, evaluate the positive-going edges of the signal $U_3$ and generate the digital control signal $U_2$. The pulses the signals $U_1$ and $U_2$ are at the "logical L" level. The pulse duration (first time interval $\Delta t_1$) of the pulses $U_1$ corresponds to "n" clock cycles and the pulses duration (second time interval $\Delta t_2$) of the pulses $U_2$ corresponds to "m" clock cycles of the scanning clock $T_O$. The pulse duration is determined by the selection of R and C in the differentiating sections 31 and 33. In a practical illustrative embodiment the pulse duration 1 to 5 preferably corresponds to two cycles of the scanning clock $T_O$ (two picture elements) so that $n = m = 2$.

The delayed black/white signal $U_{v2}$ at the output of the shift register 16 is linked logically with the control signal $U_1$ in a NAND gate 36 (signal $U_4$) and with the control signal $U_2$ in an AND gate 37 (signal $U_5$) of the logic circuit 19. The logic allows the control signals $U_1$ and $U_2$ in each case only to affect the black/white signal at the grey/black and grey/white transitions.

The outputs of the NAND gate 36 and of the AND gate 34 are connected via an OR gate 38 to the output 39 of the evaluation circuit 24 at which the black/white signal $U_v3$ appears for transmission via the transmission channel 23.

Figure 2:
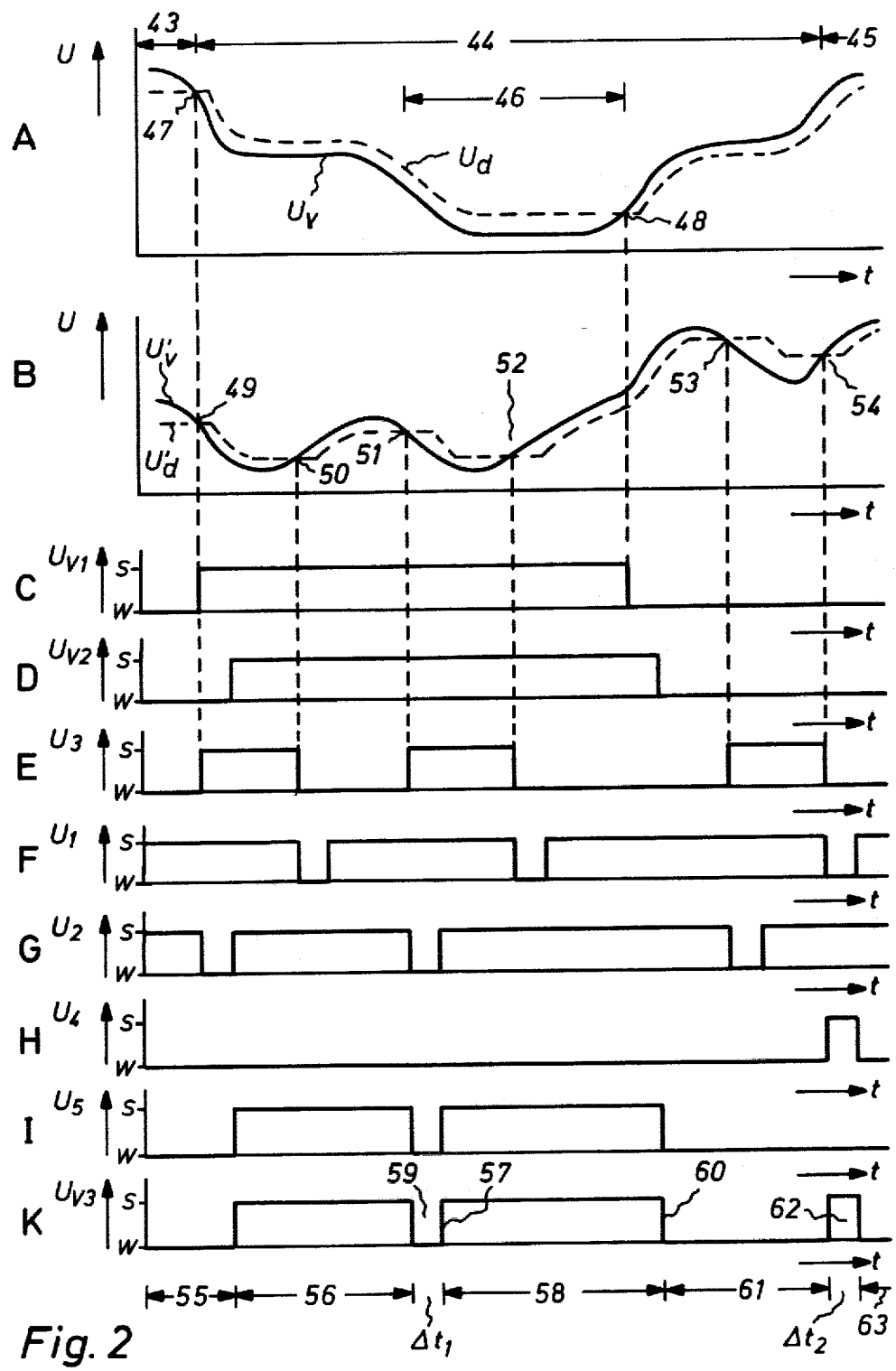
FIG. 2 shows the shapes of the signals occurring in the facsimile scanner.

FIG. 2 serves to explain in greater detail the effect of the control signals $U_1$ and $U_2$ on the black/white signal $U_{v2}$ and the effects of this measure.

FIG. 2 shows the shapes of the signals occurring in FIG. 1. In diagram (A) the shapes of the video signal $U_v$ and of the dynamic threshold signal $U_d$ along a scanning line of the original copy 1 are entered.

When white parts of the original are being scanned large video signal amplitudes arise, when black parts of the original are being scanned small amplitudes arise and with grey or coloured parts of the original medium ones.

For example, let it be assumed that in section 43 a white edge of the original in section 44 a grey or coloured (tinted) background area and in section 45 again a white edge of the original are being scanned. In section 46 a black item of information on the tinted background is being scanned. Thus the diagram A) shows a typical waveshape for a white/grey/black transition and a black/grey/white transition which, according to customary techniques, are not evaluated correctly.

Diagram (B) shows the shapes of the modified video signal $U'_v$ and of the dynamic threshold signal $U'_d$. The modified video signal $U'_v$ was produced by eliminating the DC components in the video signal $U_v$ by means of the high-pass filter 25 in FIG. 1.

Diagram (C) shows the black/white signal $U_{v1}$ at the output of the comparator 11 and diagram D) the black/white signal $U_{v2}$, delayed by "n" picture elements, at the output of the shift register 16 of FIG. 1. The high signal level corresponds to "black" and the lowest signal level to "white".

In the comparison of the video signal $U_v$ with the dynamic threshold signal $U_d$ in the comparator 11 (diagram A) only the intersection point 47 at the white/grey transition and the intersection point 48 at the black/grey transition appear at which the associated black/white signal $U_{v1}$ (diagram (C) shows a jump in level. The grey/black transition and the grey/white transition are not recognized. The signal shape shows that the tinted background area would be recorded up to its back edge (intersection point 48) of the item of information in the area 46 "black". The front edge, however, would be lost so that the item of information as a whole would be hard to read in the copy. Since the background area after the information would be recorded as "white" there would be no boundary between the background area and the white edge of the original copy at the transition from area 44 to area 45.

In diagram (E) the signal $U_3$ at the output of the comparator 29 is entered and there is a jump in level at each intersection point (49–54) between the modified video signal $U'_v$ and the dynamic threshold signal $U'_d$ (diagram B). It can be seen that the signal $U_3$ now also detects the grey/black transition (intersection point 51) and the grey/white transition (intersection point 54).

Diagrams (F) and (G) show the control signals $U_1$ and $U_2$ at the outputs of the Schmitt triggers 34 and 35. The pulses of the control voltages $U_1$ and $U_2$ arise in each case at the positive-going and negative-going edges of the signal $U_3$.

The signals $U_4$ and $U_5$ obtained by the logic in the NAND gate 36 and the NAND gate 37 are entered in the diagrams (H) and (I).

Diagram (K) shows the shape of the black/white signal $U_{v3}$ at the output of the OR gate 38 which, finally, controls the recording of the copy.

The black/white signal $U_{v3}$ first signals "white" for recording to left-hand white edge of the of the original copy (area 55), then "black" in order to record a part-area 56 of the background.

Logical interaction with the control signal $U_2$ in the logic circuit 19 causes the black/white signal $U_{v3}$ to flip to "white" for a time interval $\Delta t_1$ before the front edge 57 of the black information 58 so that the background area is recorded in an area 59 as white boundary line and the front edge 57 becomes visible in the copy. With white information on the tinted background a corresponding black boundary line is generated. 58 the black/white signal $U_{v3}$ signals "white" so that a part-area 61 of the background area is recorded as "white".

At the end of the part-area 61 then the black/white signal $U_{v3}$, due to its logical interaction with the control signal $U_1$, is flipped to "black" for a time interval $\Delta t_2$ which causes an area 62 to be recorded as black boundary line between the tinted background area and the right-hand white edge of the original copy (area 63). With a black edge of the original copy then a white boundary line is generated.

The time intervals $\Delta t_1$ and $\Delta t_2$, or the widths of the boundary lines 59 and 62, correspond to the pulse duration of the control signals $U_1$ and $U_2$ which are set by means of the differentiating sections 31 and 33 in FIG. 1. If, as in the illustrative embodiment, $n=m=1$ has been chosen the boundary lines will be about 0.3 mm wide.

Figure 3:
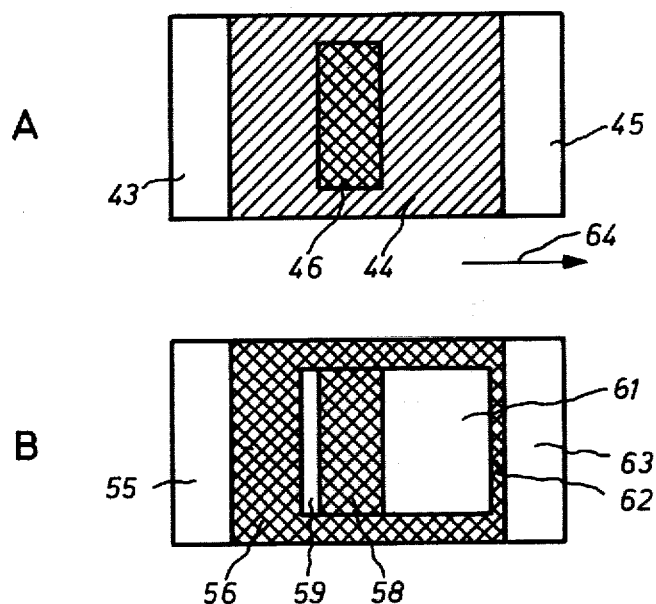
FIG. 3 shows an original and its reproduction.

In order to clarify the invention, FIG. 3 shows in A) a rectangular original aligned at right angles to the direction of the lines 64, with a white left-hand edge 43 of the tinted background 44 and with the white right-hand edge 45. The background area 44 contains the black item of information 46.

(B) shows the associated copy with the edges 55 and 63 of the original recorded as white, the part-area 56 reproduced as "black" and the part-area 61 of the background area 44 reproduced as "white". The area 59 recorded as white boundary line makes the information 58 appear to be edged in white so that the front and back edges are clearly visible. The back black boundary line (area 62) also makes the contours of the background area clearly recognizable.

Figure 4:
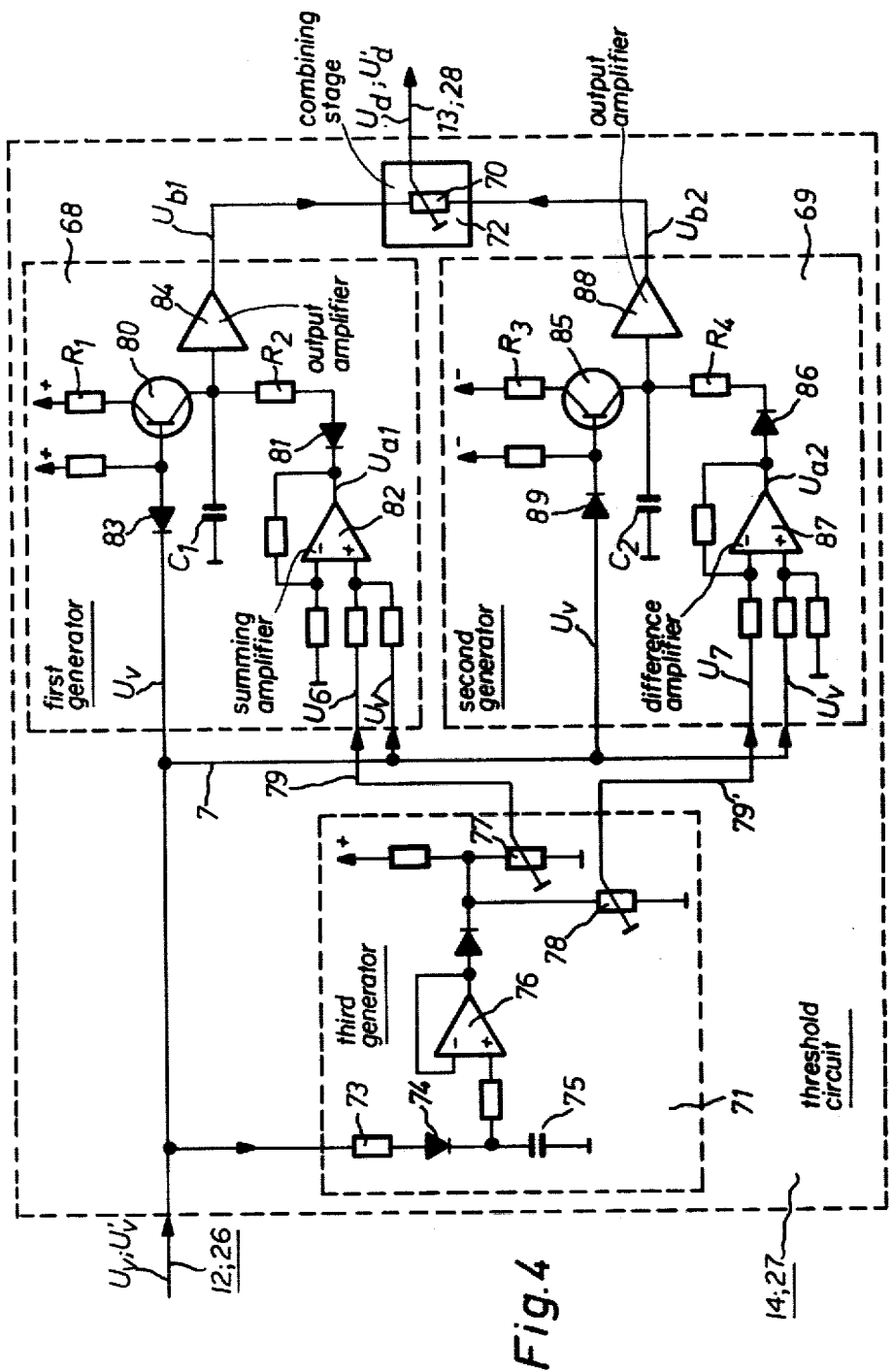
FIG. 4 shows an illustrative embodiment of a threshold circuit.

FIG. 4 shows an illustrative embodiment of the threshold circuits 14 and 27 which are of identical design.

The threshold circuit consists of a first generator 68 for forming a first accompanying signal $U_{b1}$ running along above the video signal $U_v$, a second generator 69 for forming a second accompanying signal $U_{b2}$ running along below the video signal $U_v$, a combining stage 70 and of a third generator 71. In the combining stage 70 the dynamic threshold signal $U_d$ ($U'_d$) on the line 13 is derived from the two accompanying signals $U_{b1}$ and $U_{b2}$ by voltage division. The dynamic threshold signal $U_d$ runs in each case between the accompanying signals $U_{b1}$ and $U_{b2}$ and its distance from the accompanying signals can be set by means of a potentiometer 72.

The third generator 71 consists of a peak rectifier circuit (73; 74) with a smoothing capacitor 75 and a following high-impedance amplifier 76.

The smoothing capacitor 75 is charged in each case to the highest amplitude of the video signal. Because of the high-impedance amplifier 76 the discharge time constant is very great and the smoothing capacitor 75 will discharge only a little between the individual charging phases.

From the capacitor voltage the difference values $U_6$ and $U_7$ on lines 79 and 79' are derived by means of potentiometers 77 and 78 and are proportional to the average background brightness of the original.

Addition of the signals means that the video signal $U_v$ is shifted toward the positive by the difference value $U_6$.

The first accompanying signal $U_{b1}$ corresponds to the voltage curve $U_c$ at the charging capacitor $C_1$.

When the video signal $U_v$ rises the charging capacitor $C_1$ is charged with the small time constant $\tau_1$ in each case to the video signal $U_v$ which causes the accompanying signal $U_{b1}$ to follow the video signal $U_v$. When the video signal $U_v$ drops in amplitude the transistor 80 is blocked and the capacitor cannot discharge. The maximum capacitor voltage $U_{c1}$ is retained approximately since the output amplifier 84 following it has a high impedance and the discharge circuit is still blocked.

Only when the accompanying signal $U_{b1}$ has parted from the video signal $U_v$ by the difference value $U_6$ will the diode 81 conduct and the discharge is initiated with the time constant $\tau_2$.

In this phase the accompanying signal $U_{b1}$ approaches the video signal $U_v$ according to a function of e, until the difference value $U_6$ has been reached again and discharging is stopped.

The charging capacitor $C_1$ again holds the voltage value reached until the accompanying signal $U_{b1}$ agrees with the video signal $U_v$. The accompanying signal $U_{b1}$ then again follows the rise of the video signal.

The difference values $U_6$ and $U_7$ characterize certain minimum distances between the accompanying signals $U_{b1}$ or $U_{b2}$ and a reference signal which are maintained whenn the accompanying signals are being formed. In this case the minimum distances are dependent on the mean background brightness of the original. In the illustrative embodiment selected the reference signal is the video signal so that the minimum distances exist in each case between an accompanying signal and the video signal.

The first generator 68 for forming the first accompanying signal $U_{b1}$ operates in the following manner:

It has a charging capacitor $C_1$, a charging circuit with resistor $R_1$ and transistor 80 and a discharging circuit with resistor $R_2$, a diode 81 and a summing amplifier 82.

The charging of the capacitor with a small time constant ($\tau_1 \approx R_1 C_1$) is controlled via the transistor 80 and a diode 83 by the video signal $U_v$ on the line 12. The discharging of the capacitor, on the other hand, takes place with a large time constant ($\tau_2 \approx R_2 C_1$) and is affected by the output voltage $U_{a1}$ of the summing amplifier 82. The output voltage $U_{a1}$ corresponds to the sum of the video signal $U_v$ and its associated difference value $U_6$. The second generator 69 for forming the second accompanying signal $U_{b2}$ also consists of a charging capacitor $C_2$, a charging circuit with a resistor $R_3$ and a transistor 85, a discharging circuit with a resistor $R_4$, a diode 86 and a difference amplifier 87, and of a high-impedance output amplifier 88 following the charging capacitor $C_2$ in the circuit.

The difference amplifier 87 displaces the video signal $U_v$ in the negative direction by the amount of the difference value $U_7$.

In contrast to the first generator 68, the supply voltages and diodes have the opposite polarity and the transistor 85 is a complementary type. Since the generators operate in similar manner no further explanations are necessary.

FIG. 5 shows an illustrative embodiment of the high-pass filter 25 as a second-order active filter. Such a filter is known and described, for example, in the journal "Elektronik" 1970, volume 11, pages 379 to 382.

Essentially, the high-pass filter consists of an operational amplifier 91 configured with RC sections. The operational amplifier 91 has positive feedback via a resistor $R_1$ and negative feedback via the voltage divider $R_3$ and $(k-1)R_3$. The voltage divider can be used to set the internal gain of the operational amplifier to a value k.

If $R_1 = R_2 = R$ and $C_1 = C_2 = C$ is selected the resultant cut-off frequency $f_g$ and the internal gain k, according to the literature quoted, are:

$$f_g = \frac{1}{2\pi RC \sqrt{a_2}}$$

$$k = 3 - \frac{a_1}{\sqrt{a_2}}$$

According to table 1 on page 379 of the literature quoted the coefficients $a_1$ and $a_2$ characterized different filter curves. This shows that different filter curves can be implemented in a simple manner merely by changing the internal gain k by means of the voltage divider $R_3$ and $(k-1)R_3$.

Therefore the cut-off frequency $f_g$ of the high-pass filter 25 can be fixed simply by changing R and C, preferably by changing the two identical capacitors $C_1$ and $C_2$.

In the illustrative embodiment the cut-off frequency $f_g$ of the high-pass filter 25 is placed in such a manner that no essential picture frequencies are lost. In addition, the skirt of the high-pass filter 25 should be as steep as possible which can be achieved by connecting several high-pass filters in series.

We claim:

1. An arrangement for converting a video signal into a bilevel black/white recording signal in facsimile reproduction, comprising a scanning member for obtaining a video signal by scanning an original having white, black, and tinted (grey or colored) areas, a threshold circuit following said scanning member and arranged to form a first dynamic threshold signal, a comparator to which said video signal and said dynamic threshold signal are applied, for generating a bilevel black/white signal, a device connected to said scanning member for generating a modified videosignal by suppressing the DC component of said video signal, a further threshold circuit following said device, arranged to form a second dynamic threshold signal, a further comparator to which said modified video signal and said second dynamic threshold signal are applied, for generating a modified bilevel black/white signal, and means for switching said bilevel black/white signal, if previously black, from black to white for a short interval of time and then back to black, in the region of each transition on the original from tinted to black, and for switching said bilevel black/white signal, if previously white, from white to black for a short interval of time and then back to white, in the region of each transition on the original from tinted to white, to obtain a black/white facsimile recording signal which produces a facsimile having a contrasting boundary at each such transition, said means comprising a pulse generating stage, connected to said further comparator, for generating control signals from the modified video signal, and a logic switching circuit connected to said comparator and said pulse generating stage.

2. An arrangement according to claim 1, wherein said device for suppressing the DC component of said video signal comprising a high-pass filter.

3. An arrangement according to claim 1, wherein said pulse generating stage consists of differentiating means and series-connected pulse former stages.

4. An arrangement according to claim 1, wherein a delay stage for the black/white signal is arranged between said comparator and said logic circuit.

5. An arrangement according to claim 4, wherein said delay stage comprising a shift register.

6. In facsimile reproduction, a method for converting a video signal, generated by scanning an original dot by dot and line by line, into a bilevel black/white recording signal, said original having white, black and tinted (grey or coloured) areas, said method comprising the steps of:
 a. generating a first dynamic threshold signal from said video signal following said video signal dynamically;
 b. converting said video signal into a bilevel black/white signal by comparing said video signal and said first dynamic threshold signal, said black/white signal having signal steps at each transition from white to tinted and from black to tinted areas in the original;
 c. suppressing the DC component of said video signal to obtain a modified video signal;
 d. generating a second dynamic threshold signal from said modified video signal following said modified video signal dynamically;
 e. converting said modified video signal into a bilevel modified black/white signal by comparing said modified video signal and said second dynamic threshold signal, said modified black/white signal having signal steps at each transition from tinted to black and from tinted to white areas of the original;
 f. switching said black/white signal in the region of a tinted to black transition of said modified black/white signal for a first time interval to "white" ("black") if previously the signal level of said black/white signal has changed from "white" ("black") to "black" ("white"), whereby a first "white" ("black") boundary line running transversely with respect to the scanning direction is produced at the transition from a tinted to an adjacent black (white) area in the original, said first time interval determining the width of said first boundary line; and
 g. switching said black/white signal in the region of a tinted to white transition of said modified black/white signal for a second time interval to "black" ("white") if previously the signal level of said black/white signal has changed from "black" ("white") to "white" ("black"), whereby a second "black" ("white") boundary line is produced at the transition from a tinted to an adjacent white (black) area in the original, said second time interval determining the width of said second boundary line, said switched black/white signal representing said black/white recording signal for facsimile reproduction.

7. A method according to claim 6, further comprising the steps of:
 a. producing first and second control signals from said modified black/white signal occuring at the corresponding signal steps, the pulse duration of said first and second control signals determining said first and second time intervals; and
 b. switching said black/white signal by said first and second control signals.

8. A method according to claim 6, wherein the DC component of said video signal is suppressed by means of a high-pass filter.

9. A method according to claim 6, wherein, in the process of scanning the original dot by dot and line by line, each image dot is associated with one cycle of a scanning clock and wherein said first and second time intervals is associated in each case with a defined number of cycles or image dots respectively.

10. A method according to claim 9, wherein said defined number is between 1 and 5.

11. A method according to claim 6, wherein the black/white signal is delayed before said switching operation by the amount of the first time interval.

12. A method according to claim 11, wherein the black/white signal is delayed by means of a shift register controlled by said scanning clock.

* * * * *